(12) United States Patent
Kato

(10) Patent No.: US 8,325,066 B2
(45) Date of Patent: Dec. 4, 2012

(54) PHOTOELECTRIC ENCODER

(75) Inventor: Yoshiaki Kato, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 119 days.

(21) Appl. No.: 13/025,198

(22) Filed: Feb. 11, 2011

(65) Prior Publication Data

US 2011/0199240 A1    Aug. 18, 2011

(30) Foreign Application Priority Data

Feb. 12, 2010  (JP) ................................. 2010-029403

(51) Int. Cl.
*H03M 1/22*    (2006.01)

(52) U.S. Cl. .. 341/13; 341/11; 250/231.13; 250/231.14; 250/231.18

(58) Field of Classification Search ................ 341/1, 11, 341/13; 250/231.13, 231.14, 231.16, 231.18
See application file for complete search history.

(56) References Cited

U.S. PATENT DOCUMENTS

| | | | | |
|---|---|---|---|---|
| 6,392,224 B1 * | 5/2002 | Holzapfel et al. | ....... | 250/231.13 |
| 7,265,339 B1 * | 9/2007 | Ng et al. | .................. | 250/231.16 |
| 7,276,687 B2 * | 10/2007 | Okada | ...................... | 250/231.13 |
| 7,663,093 B2 * | 2/2010 | Kusano | .................... | 250/231.18 |
| 8,110,792 B2 * | 2/2012 | Morimoto | ................ | 250/231.14 |

FOREIGN PATENT DOCUMENTS

JP            64-057120         3/1989

\* cited by examiner

*Primary Examiner* — Khai M Nguyen
(74) *Attorney, Agent, or Firm* — Rankin, Hill & Clark LLP

(57) ABSTRACT

A photoelectric encoder includes: a scale having a grating formed with a predetermined period Ps; and a detector head being movable relative to the scale and including a light source and a light receiving unit. In a configuration where light receiving elements in the light receiving unit output N-points light and dark signals (N is an integer of 3 or more), and where phases of the N-points light and dark signals are detected by a least-squares method to fit a sinusoidal function with fixed period to N-points digital signals digitized from the N-points light and dark signals, an N-points light and dark signal period P is set at an integral multiple of a data-point interval w of the N-points digital signals, and an overall length M of the light receiving elements is set at an integral multiple of the N-points light and dark signal period P. Thereby, position detecting errors occurring due to a stain of the scale and/or a defect in the grating can be reduced by simple computing.

11 Claims, 16 Drawing Sheets

Fig. 4
(a)
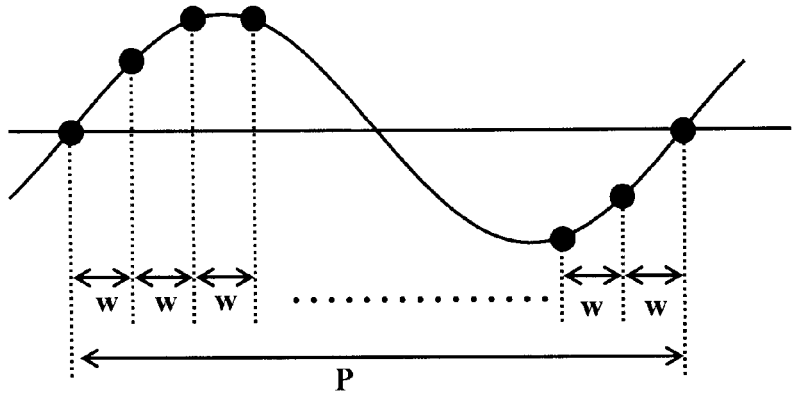
w: Data-point interval
(eg, light-receiving-element pitch Pd)
P: N-points light and dark signal period
(eg, Scale period Ps)
M: Overall length of light receiving element
(= Overall analysis length L)
(b)
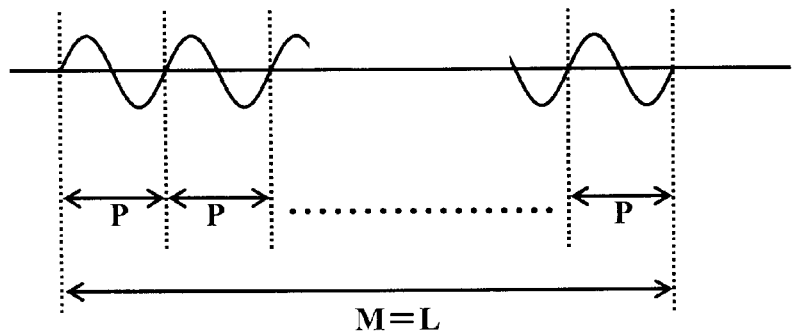

Fig. 5

(a) When N-points light and dark signal period P is not integral multiple of data-point interval w

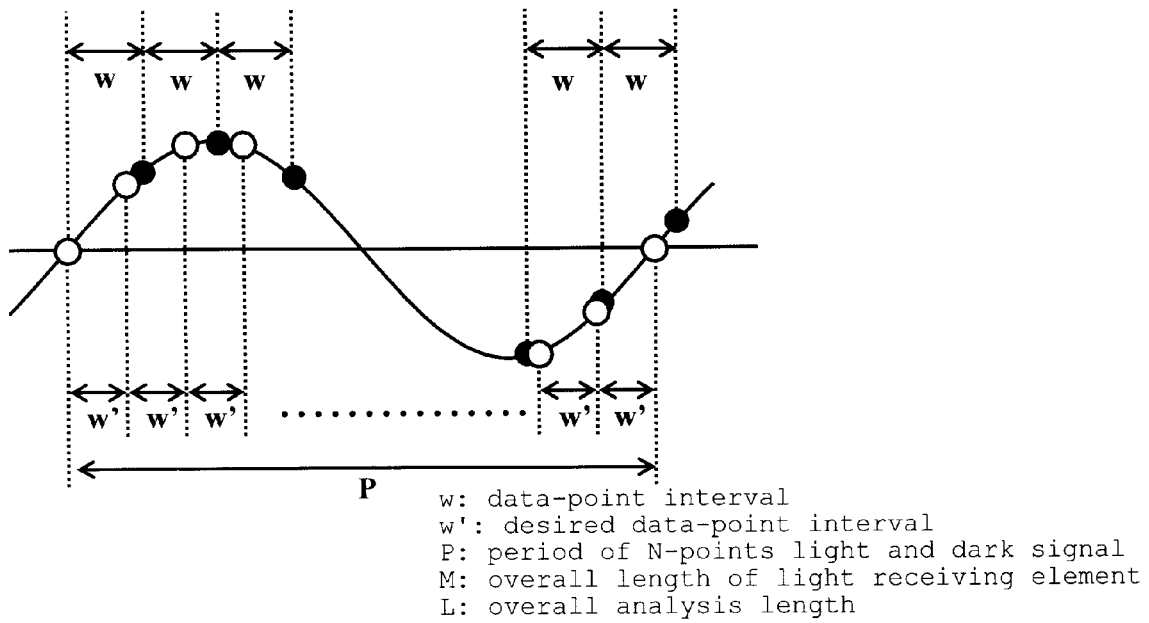

w: data-point interval
w': desired data-point interval
P: period of N-points light and dark signal
M: overall length of light receiving element
L: overall analysis length (b) When overall length M of light receiving element is not integral multiple of N-points light and dark signal period P

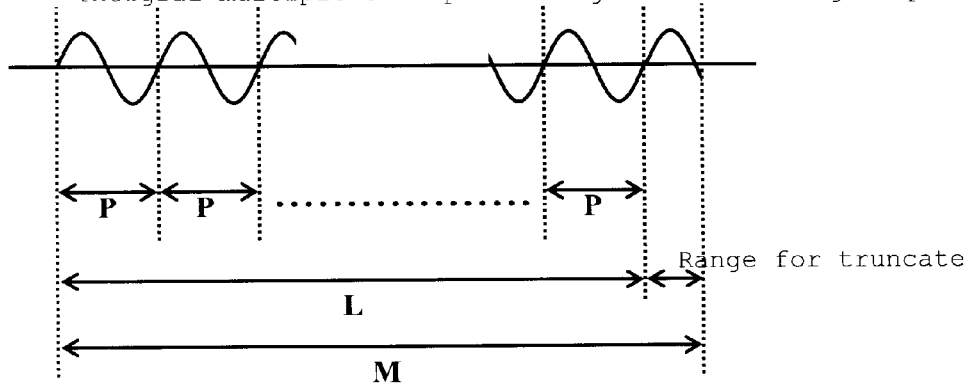

Fig. 13
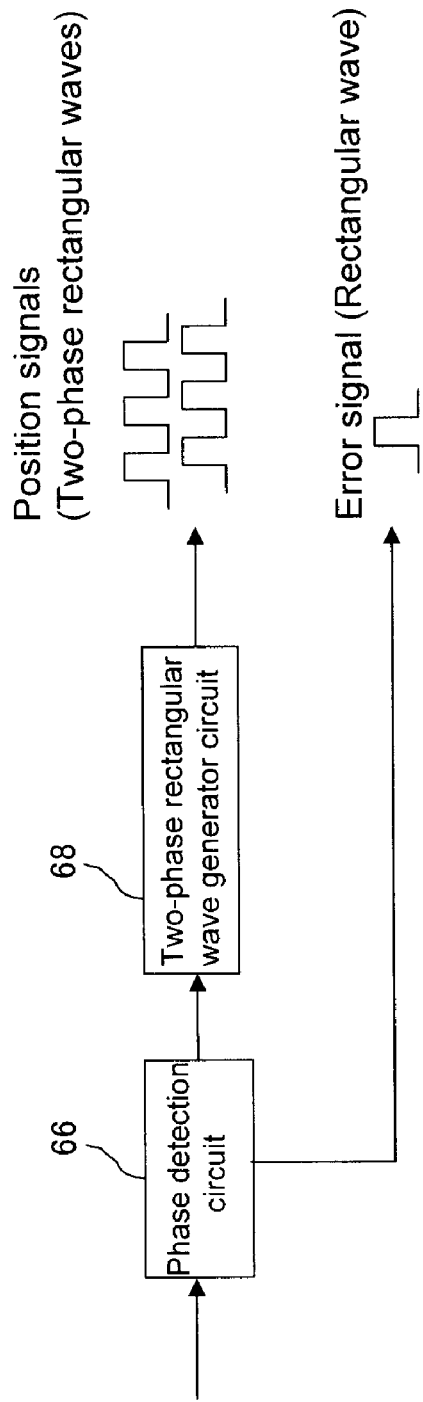
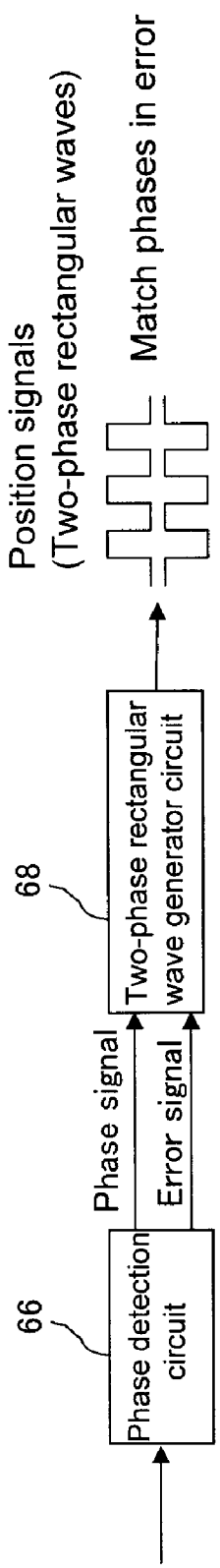
(A) When error signal is outputted
(B) When error signal is expressed by two-phase rectangular waves When light-receiving-element pitch Pd is coarser than scale period Ps, aliasing occurs and period different from Ps is detected Since period is fixed in invention, appropriate phase detection is carried out without causing aliasing m: Optical system magnification $m = B / A$ m: Optical system magnification $A : B = 2 : 1$ $m = B / A = 0.5$ m: Optical system magnification

A : B = 1 : 2 m = B / A = 2

PHOTOELECTRIC ENCODER

CROSS-REFERENCE TO RELATED APPLICATION

The disclosure of Japanese Patent Application No. 2010-29403 filed on Feb. 12, 2010 including specifications, drawings and claims is incorporated herein by reference in its entirety.

BACKGROUND OF THE INVENTION

1. Field of the Invention

The present invention relates to a photoelectric encoder including a scale in which a grating is formed with a predetermined period, a light source and a light receiving unit which are movable relative to the scale. The present invention particularly relates to a photoelectric encoder suitable for use as a linear encoder and capable of reducing occurrence of a position detecting error due to stain on the scale or a defect of the grating through simple computing.

2. Description of the Related Art

Conventionally, a photoelectric encoder has been utilized for precisely measuring an amount of linear movement of an object to be measured. An arctangent calculation of Lissajous signals obtained from a light receiving element array is one of the position sensing methods often employed for an optical encoder.

In a method proposed in Japanese Patent Application Publication No. Sho 64-57120 (Patent Document 1), for example, firstly light receiving elements made of P-type semiconductor layers 34 respectively forming photosensitive zones 35 are arranged in an array at a pitch having a phase difference from the phase of an optical grating 12 of a scale 13, as shown in FIGS. 1 and 2 of Patent Document 1. Next, differential amplifiers 38A and 38B each amplify a difference between output signals from the light receiving elements to generate a Lissajous signal. Further, an arctangent calculation is performed on the Lissajous signals, so that a position is detected.

SUMMARY OF THE INVENTION

However, when the scale is adhered by stain or has a grating defect as shown in FIG. 1 of the present application, some of measurement light beams which should reach the light receiving elements 34 is blocked by the stain or the grating defect that varies in size, the light receiving elements 34 output unbalanced signals. When the light receiving elements 34 output the unbalanced signals, a direct current component of the Lissajous signal is offset from a normal position shown by a solid line in FIG. 2 to a position shown by a broken line therein. This causes a problem of an error in position detection using the arctangent calculation.

To solve such a problem, the following phase detection in a photoelectric encoder is conceivable. Specifically, the photoelectric encoder includes: a scale in which a grating is formed with a predetermined period; and a sensor head which has a light source and a light receiving unit and which is movable relative to the scale. In the photoelectric encoder, light receiving elements in the light receiving unit output N-points light and dark signals (N is an integer of 3 or more). Then, a sinusoidal function with fixed period is fitted to N-points digital signals digitized from the N-points light and dark signals, as illustrated in FIG. 3. Thus, the phases of the N-points light and dark signals are detected.

This technique is expected to improve accuracy in comparison with a method in which computing is performed on only edges, because this method performs computing on all the imaged points. However, a large amount of computing in the technique involves a long computing time. This requires a high-performance signal processing circuit, thus causing a problem of a high cost.

The present invention has been made to solve the problems in the prior art. An object of the invention is to reduce a cost by speeding up computing for deriving a model sinusoidal function with use of a least-squares method and thereby by making the computing applicable to even an inexpensive processing circuit.

In the technique shown in FIG. 3, when the fitting function is a sinusoidal wave with fixed period shown by $$y = A\sin(x-B)-C \quad (1),$$

parameters A, B and C in the equation (1) are derived by the following equations:

$$A = \sqrt{a^2+b^2}$$

$$\sin(-B) = b/\sqrt{a^2+b^2}$$

$$\cos(-B) = a/\sqrt{a^2+b^2}$$

$$C = c \quad (2),$$

In the equation (2), variables a, b and c in the equations (2) are defined by the following equations:

$$a = \overline{a}/d$$

$$b = \overline{b}/d$$

$$c = \overline{c}/d \quad (3),$$

where $\overline{a}$, $\overline{b}$, $\overline{c}$ and d in the equations (3) are expressed by the following equations:

$$\overline{a} = \sum_i \sin x_i \sum_i \cos x_i \sum_i y_i \cos x_i + \sum_i y_i \sum_i \cos x_i \sum_i \sin x_i \cos x_i + \quad (4)$$
$$N \sum_i y_i \sin x_i \sum_i \cos^2 x_i - \left(\sum_i \cos x_i\right)^2 \sum_i y_i \sin x_i -$$
$$\sum_i y_i \sum_i \sin x_i \sum_i \cos^2 x_i - N \sum_i y_i \cos x_i \sum_i \sin x_i \cos x_i,$$

$$\overline{b} = \sum_i \sin x_i \sum_i \cos x_i \sum_i y_i \sin x_i + \sum_i y_i \sum_i \sin x_i \sum_i \sin x_i \cos x_i + \quad (5)$$
$$N \sum_i y_i \cos x_i \sum_i \sin^2 x_i - \left(\sum_i \sin x_i\right)^2 \sum_i y_i \cos x_i -$$
$$\sum_i y_i \sum_i \cos x_i \sum_i \sin^2 x_i - N \sum_i y_i \sin x_i \sum_i \sin x_i \cos x_i,$$

$$\overline{c} = \sum_i \sin x_i \sum_i \sin x_i \cos x_i \sum_i y_i \cos x_i + \quad (6)$$
$$\sum_i \cos x_i \sum_i \sin x_i \cos x_i \sum_i y_i \sin x_i +$$
$$\sum_i y_i \sum_i \sin^2 x_i \sum_i \cos^2 x_i - \sum_i \sin x_i \sum_i \cos^2 x_i \sum_i y_i \sin x_i -$$
$$\sum_i \cos x_i \sum_i \sin^2 x_i \sum_i y_i \cos x_i - \sum_i y_i \left(\sum_i \sin x_i \cos x_i\right)^2,$$

and $$d = 2\sum_i \sin x_i \sum_i \cos x_i \sum_i \sin x_i \cos x_i + \quad (7)$$
$$N\sum_i \sin^2 x_i \sum_i \cos^2 x_i - \sum_i \sin x_i \sum_i \sin x_i \sum_i \cos^2 x_i -$$
$$\sum_i \cos x_i \sum_i \cos x_i \sum_i \sin^2 x_i - N\left(\sum_i \sin x_i \cos x_i\right)^2.$$

Meanwhile, the following equations (8) hold true $$\sum_i \sin x_i = 0 \quad (8)$$
$$\sum_i \cos x_i = 0$$
$$\sum_i \sin^2 x_i = N/2$$
$$\sum_i \cos^2 x_i = N/2$$
$$\sum_i \sin x_i \cos x_i = 0,$$

in a case where a data-point interval w of the N-points digital signals and an overall length M of light receiving elements are designed so that the conditions following and shown in FIGS. 4A and 4B can be satisfied:

a. A period P (for example, scale period Ps) of the N-points light and dark signal is an integral multiple (P=n·w, where n is an integer of 1 or more) of the data-point interval w (for example, a pitch Pd of the light receiving elements) of the N-points digital signals; and b. The overall length M of the light receiving elements is an integral multiple (M=N·P, where N is an integer of 1 or more) of period P of the N-points light and dark signal (here, the overall length M of the light receiving elements=an overall length L to be analyzed (called an overall analysis length L below)).

Here, the equations (8) are substituted into the equations (4) to (7) to derive the variables a, b and c, and thereby the following equations can be obtained:

$$a = \frac{2}{N}\sum_i y_i \sin x_i \quad (9)$$
$$b = \frac{2}{N}\sum_i y_i \cos x_i$$
$$c = \frac{\sum_i y_i}{N}.$$

Furthermore, the equations (9) are substituted into the equations (2), and thereby the parameters A, B and C can be obtained as in the following equations:

$$A = \frac{2}{N}\sqrt{\left(\sum_i y_i \sin x_i\right)^2 + \left(\sum_i y_i \cos x_i\right)^2} \quad (10)$$

$$\sin(-B) = \frac{\sum_i y_i \cos x_i}{\sqrt{\left(\sum_i y_i \sin x_i\right)^2 + \left(\sum_i y_i \cos x_i\right)^2}}$$

$$\cos(-B) = \frac{\sum_i y_i \sin x_i}{\sqrt{\left(\sum_i y_i \sin x_i\right)^2 + \left(\sum_i y_i \cos x_i\right)^2}}$$

$$C = \frac{\sum_i y_i}{N}.$$

Meanwhile, for a case of obtaining the phase, in particular, the equations (10) may be transformed into the following equations in consideration that the calculation needs only a ratio of sin(−B) to cos(−B):

$$\sin(-B) = M\sum_i y_i \cos x_i \quad (11)$$
$$\cos(-B) = M\sum_i y_i \sin x_i$$
$$\therefore M = \frac{1}{\sqrt{\left(\sum_i y_i \sin x_i\right)^2 + \left(\sum_i y_i \cos x_i\right)^2}}.$$

At this time, the phase B can be expressed by the following equation:

$$B = \arctan\left(-\frac{\sum_i y_i \cos x_i}{\sum_i y_i \sin x_i}\right). \quad (12)$$

Here, also even in a case where a relationship between the N-points light and dark signal period P and the data-point interval w of the N-points digital signals does not satisfy the above-described conditions a and b provided for reducing the computing time, the present invention is made applicable by the following processing:

a. When the N-points light and dark signal period P is not an integral multiple of the data-point interval w, the data-point interval w can be adjusted to a data-point interval w' in any manner of performing interpolation for N-points light and dark signals by generating new data points, i.e., by interpolating an intermediate data point within each data-point interval w so that the N-points light and dark signal period P can be an integral multiple of the data-point interval w, as illustrated in FIG. 5A; or b. When the overall length M of the light receiving elements is not an integral multiple of the N-points light and dark signal period P, the overall analysis length L can be adjusted exactly to a desired length by truncating the overall length M of the light receiving element so that the overall analysis length L can be an integral multiple of the N-points light and dark signal period P, as illustrated in FIG. 5B.

The present invention has been made based on the aforementioned technical findings, and solves the above problems by providing a photoelectric encoder including: a scale in which a grating is formed with a predetermined period Ps; and a detector head which is movable relative to the scale and which includes a light source and a light receiving unit. In a configuration in which light receiving elements in the light receiving unit output N-points light and dark signals (N is an integer of 3 or more), and in which phases of the N-points light and dark signals are detected by performing a least-squares method to fit a sinusoidal function with fixed period to N-points digital signals respectively digitized from the N-points light and dark signals, a period P of the N-points light and dark signals is set at an integral multiple of a data-point interval w of the N-points digital signals, and an overall length M of the light receiving elements is set at an integral multiple of the period P of the N-points light and dark signals.

In the above configuration, the fitting function may be a sinusoidal wave with fixed period expressed by $$y = A\sin(x-B) - C,$$

where A, B and C are parameters.

In addition, the parameters A, B and C may be obtained by equations $$A = \frac{2}{N}\sqrt{\left(\sum_i y_i \sin x_i\right)^2 + \left(\sum_i y_i \cos x_i\right)^2}$$

$$\sin(-B) = \frac{\sum_i y_i \cos x_i}{\sqrt{\left(\sum_i y_i \sin x_i\right)^2 + \left(\sum_i y_i \cos x_i\right)^2}}$$

$$\cos(-B) = \frac{\sum_i y_i \sin x_i}{\sqrt{\left(\sum_i y_i \sin x_i\right)^2 + \left(\sum_i y_i \cos x_i\right)^2}}$$

$$C = \frac{\sum_i y_i}{N}.$$

Instead, the parameter B may be obtained by an equation $$B = \arctan\left(-\frac{\sum_i y_i \cos x_i}{\sum_i y_i \sin x_i}\right).$$

Moreover, when the period P of the N-points light and dark signals is not an integral multiple of the data-point interval w of the N-points digital signals, data points may be generated by performing interpolation for the data-point interval w of the N-points digital signals so that the period P of the N-points light and dark signals is an integral multiple of the data-point interval w of the N-points digital signals, as illustrated in FIG. 5A.

Additionally, when the overall length M of the light receiving elements is not an integral multiple of the period P of the N-points light and dark signals, an overall analysis length L may be adjusted by truncating the overall length M of the light receiving elements so that the overall analysis length L is an integral multiple of the period P of the N-points light and dark signals, as illustrated in FIG. 5B.

The period P of the N-points light and dark signals may be equalized to the scale period Ps.

Further, the data-point interval w of the N-points digital signals may be made to correspond a pitch Pd of the light receiving elements.

Further, stain on the scale or a defect of the grating may be detected based on the N-points light and dark signals.

Further, a point corresponding to the stain on the scale or the defect of the grating may be excluded from fitting target points, and thereafter the fitting may be performed again.

Further an accidental error in position detecting may be detected when an amplitude A of the sinusoidal function is smaller than a predetermined threshold.

According to the present invention, computing time required for fitting of a sinusoidal function can be significantly reduced by reducing an amount of least-squares method-based computing for deriving a model function of sinusoidal wave with fixed period.

Although the intensity of the light and dark signals outputted from the light receiving elements is partially lowered when the detector head is located at a point corresponding to stain on the scale or a defect of the grating, the configuration of the present invention is more likely to prevent light receiving elements in the same phase from suffering selective blocking of light beams, unlike the prior art in Patent Document 1. Thus, this configuration more frequently prevents position detecting from becoming impossible and thereby enables continuous position detecting.

Furthermore, the arctangent calculation is not performed in which an error occurs due to the direct current offset of the Lissajous signal, as shown in FIG. 2. Thus, even when the signals are degraded due to the stain, an error is less likely to occur in the position detecting.

In addition, it is possible to detect a point corresponding to stain on the scale and/or a defect of the grating and to exclude the point from position detecting target points.

Meanwhile, when the scale is adhered by too much stain or has too many defects in the grating, the amplitude of the sinusoidal function takes a value near zero. For this reason, an accidental error in position detecting can be detected by setting a predetermined threshold in advance.

Further, using a sinusoidal function with fixed period, the present invention exerts excellent advantageous effects, such as avoiding aliasing in which a wrong period is detected.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein:

FIGS. 4A and 4B are diagrams showing a principle of the present invention;

FIGS. 5A and 5B are diagrams showing a principle of a modification of the present invention;

FIGS. 13A and 13B are diagrams each showing an example of a circuit to detect a point corresponding to stain on the scale or a defect of the grating, and to output the detection as an error;

DETAILED DESCRIPTION OF THE PREFERRED EMBODIMENTS

Figure 1:
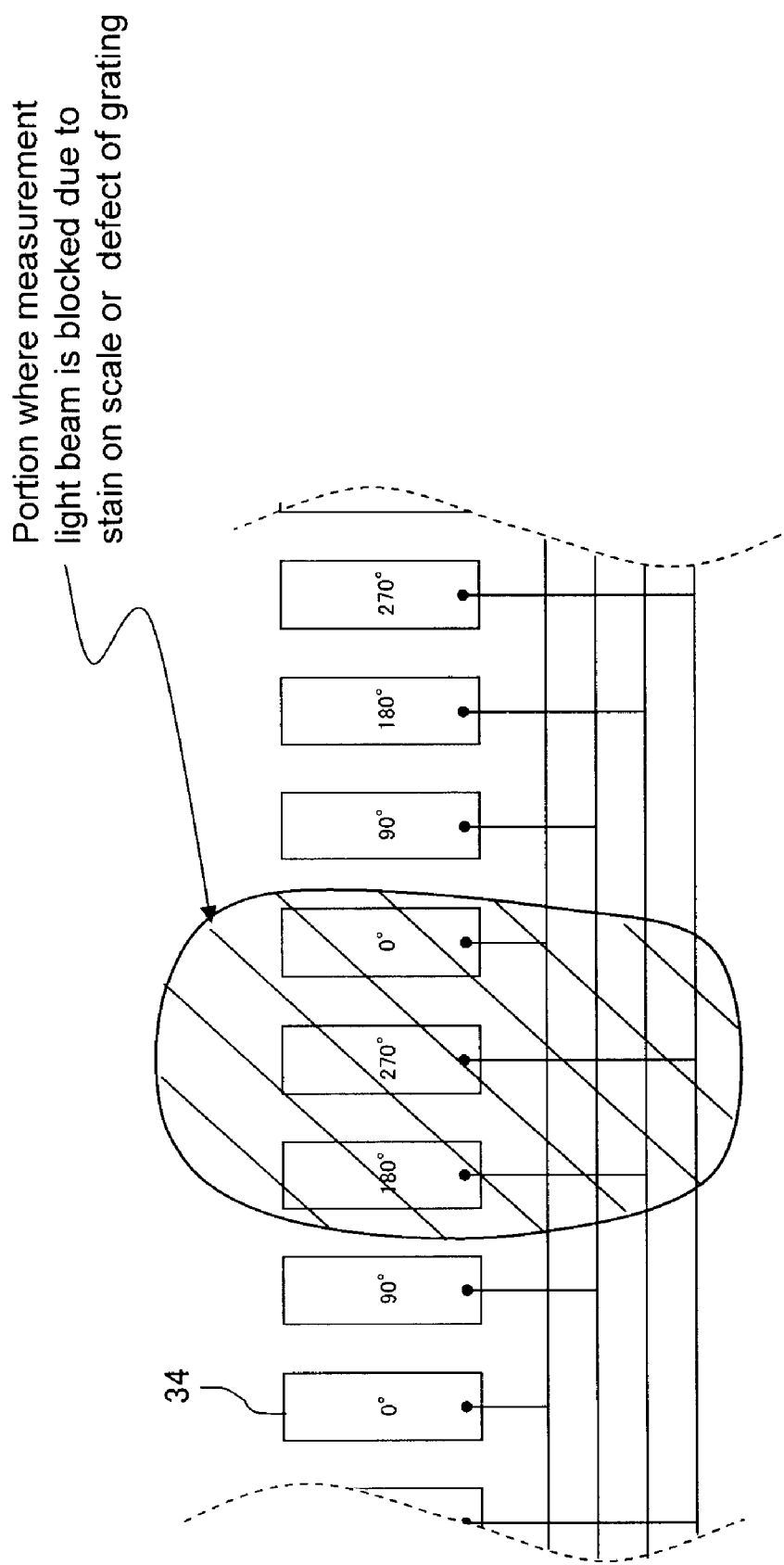
FIG. 1 is a plan view showing that measurement light beams are blocked due to stain on a scale or a defect of a grating.

Hereinbelow, detailed descriptions are given of embodiments of the present invention by referring to the drawings.

Figure 6:
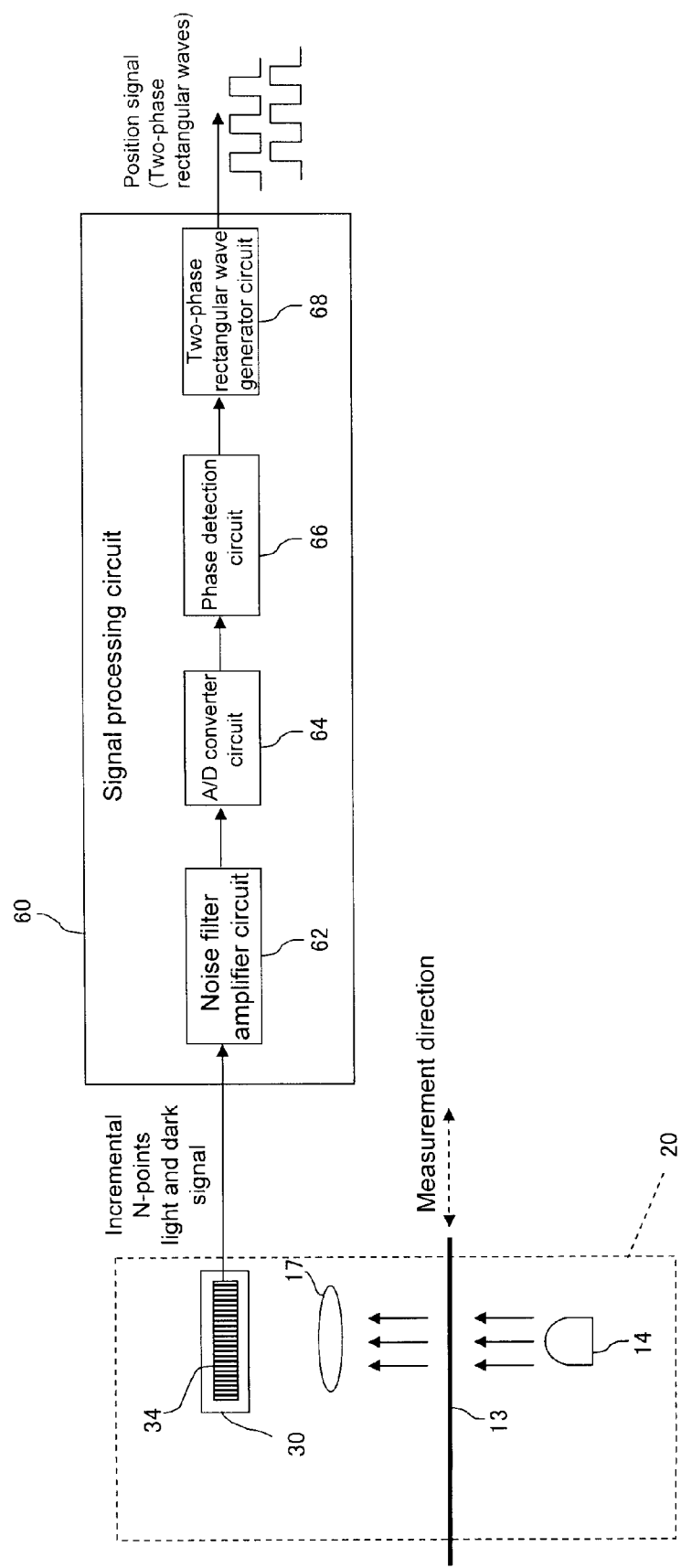
FIG. 6 is a diagram showing an overall configuration of a first embodiment of the present invention.
Figure 7:
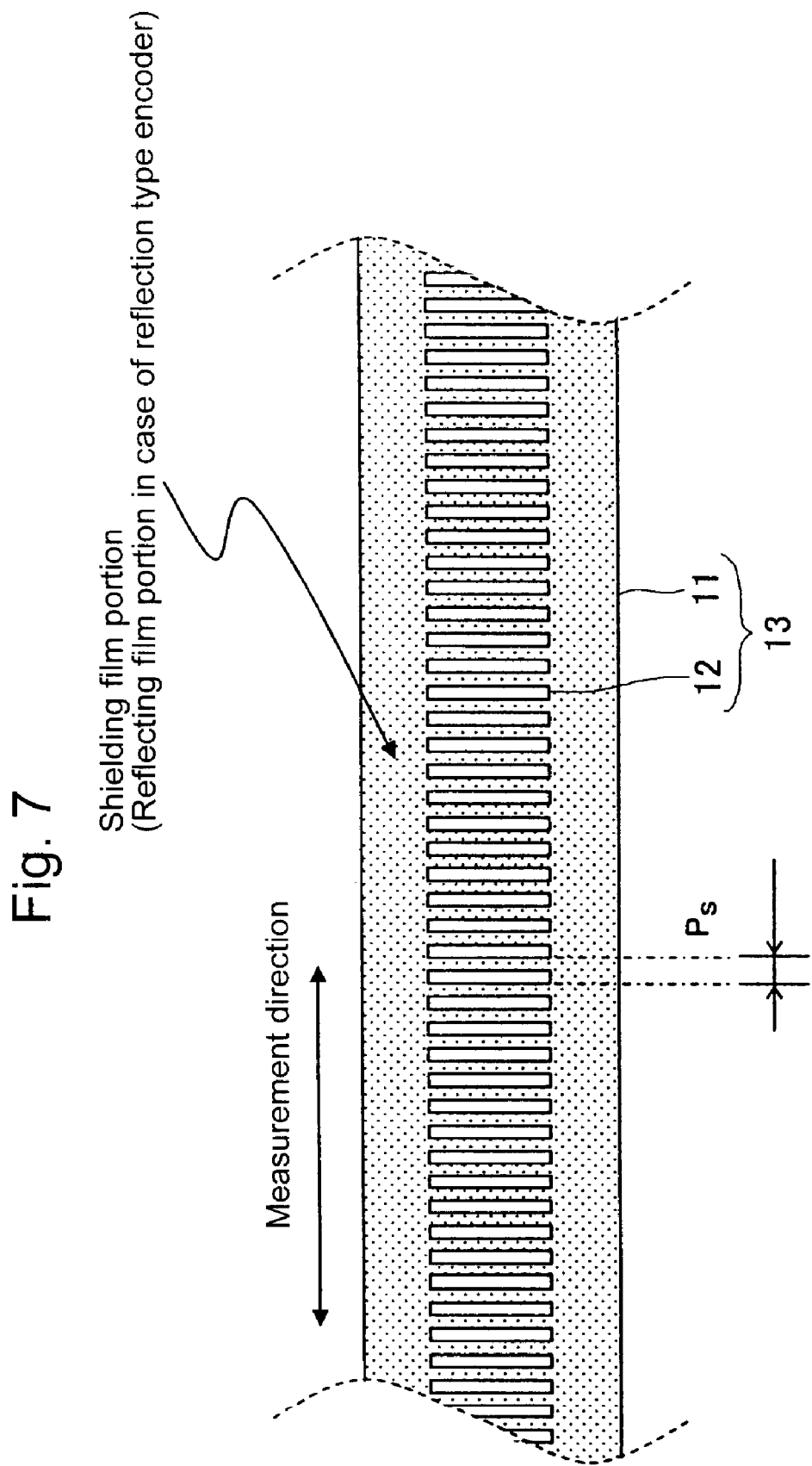
FIG. 7 is a plan view showing a configuration of a scale of the first embodiment.

FIG. 6 shows an outline of an overall configuration of a first embodiment of a photoelectric encoder according to the present invention. The photoelectric encoder includes: a detector head 20 provided with a scale 13, a light emitting element 14, a collimator lens 17 and a light receiving unit 30 equipped with light receiving elements 34 arranged in an array; and a signal processing circuit 60. In the scale 13, an incremental pattern with a period (scale period) Ps is formed as a grating 12 on a transparent substrate 11, as shown in FIG. 7. The light emitting element 14 is a light source which emits measurement light beams. The collimator lens 17 collimates the measurement light beams. The signal processing circuit 60 outputs position signals by processing output signals from the light receiving elements 34. In this configuration, the scale 13 is movable in a measurement direction relative to the detector head 20 including the light emitting element 14 and the light receiving unit 30.

Figure 8:
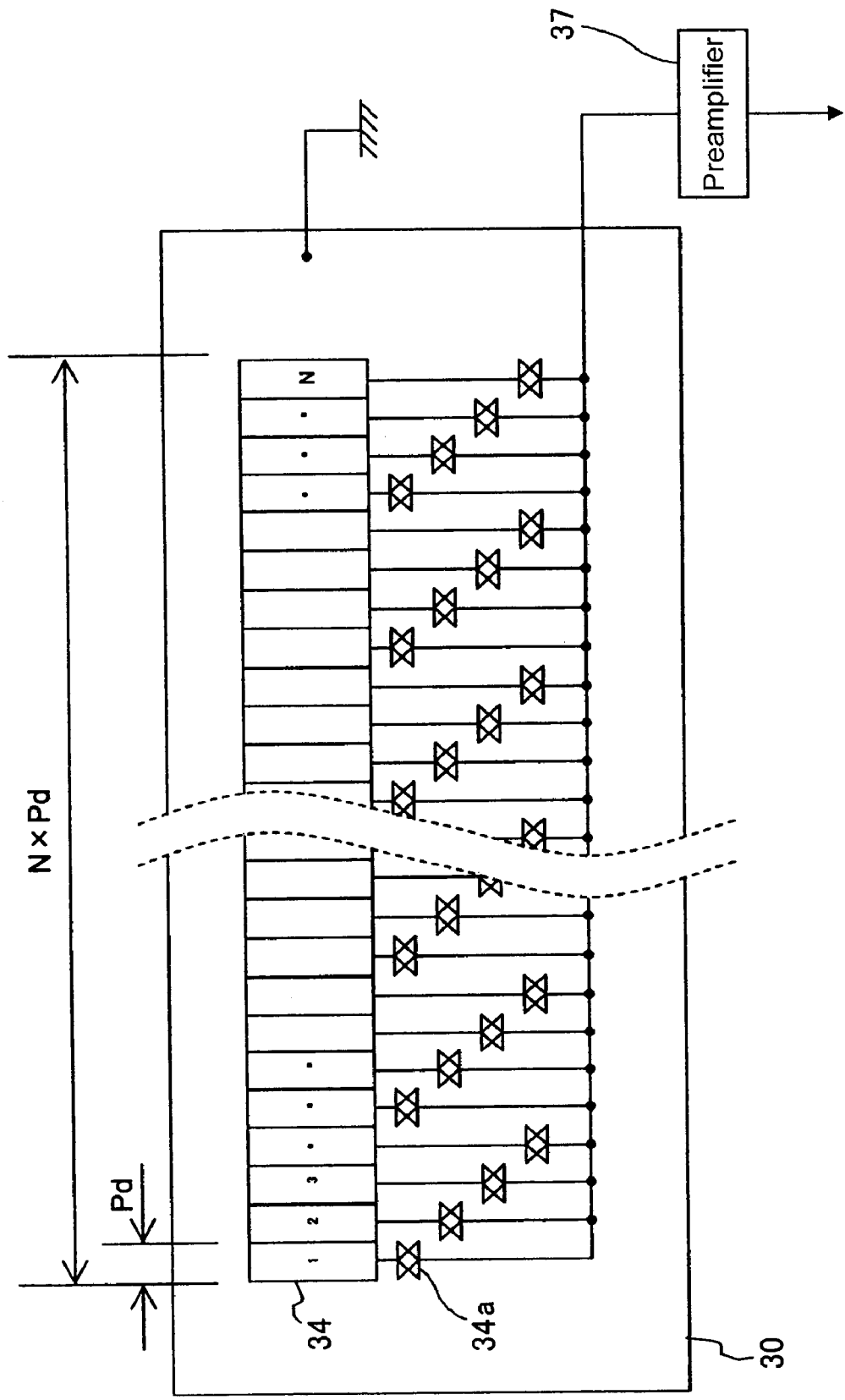
FIG. 8 is a plan diagram showing a configuration of a light receiving unit of the first embodiment.
Figure 9:
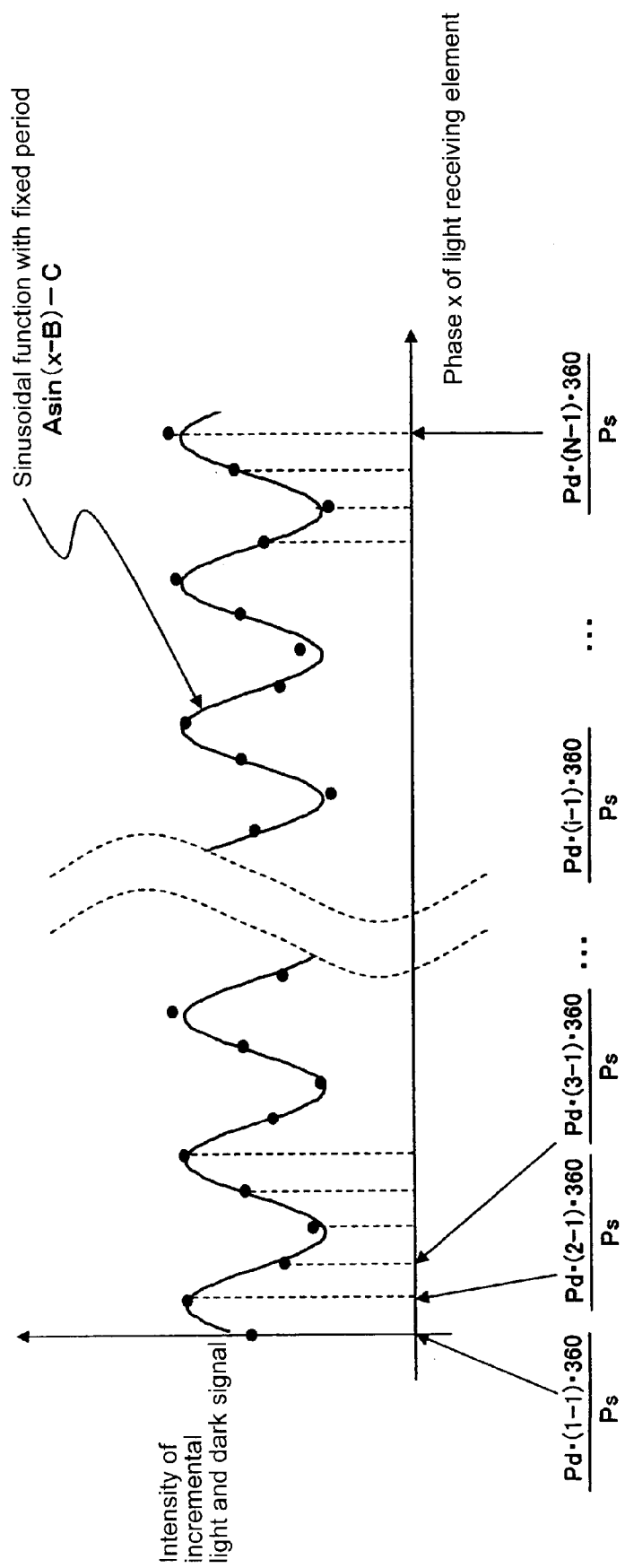
FIG. 9 is a diagram showing an example of a fitting state of a sinusoidal function under normal conditions in the first embodiment.

As shown in FIG. 8, the light receiving unit 30 includes N light receiving elements 34 (N is an integer of 3 or more, for example, 1024 elements) arranged in an array at constant intervals (light-receiving-element pitch) Pd corresponding to data-point intervals w, and outputs light and dark signals of N-points (for example, 1024 phases) through a preamplifier 37. Here, the N-points light and dark signals are generated in such a way that: the light receiving elements 34 output signals by photoelectrically converting incident measurement light beams; and then switching elements 34a sweep the output signals from the light receiving elements 34. In the prior art in Patent Document 1, selective malfunction of the light receiving elements in the same phase makes the position detecting impossible. However, in the present invention, all the light receiving elements equally function, and thus the position detecting is less likely to become impossible.

Figure 15:
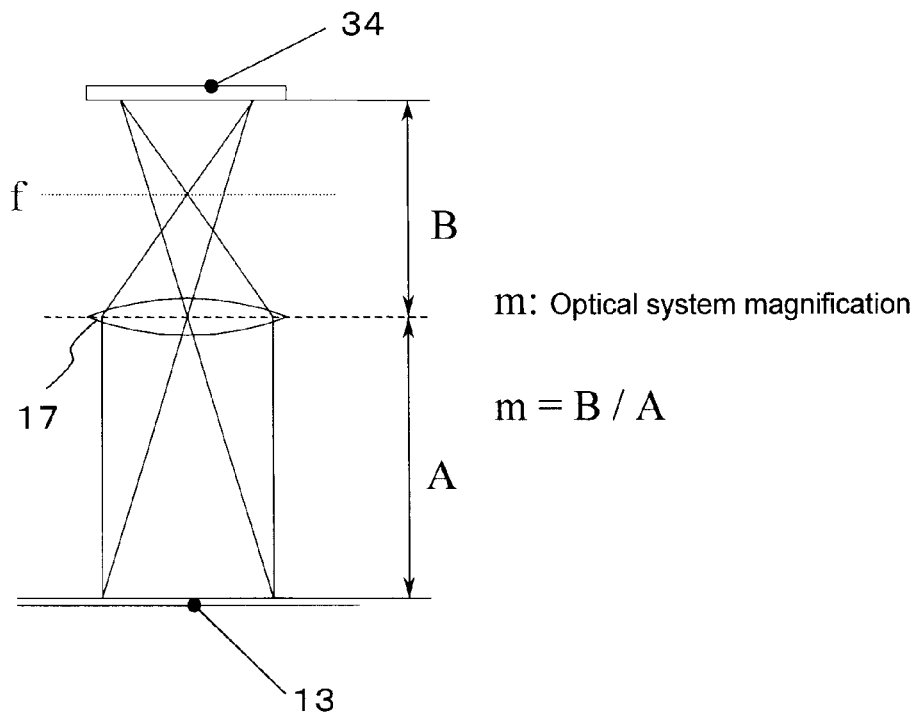
FIG. 15 is a diagram showing a configuration of a principal part in a second embodiment of the present invention.

In this embodiment, a distance A between the collimator lens 17 and the scale 13 is set equal to a distance B between the collimator lens 17 and the light-receiving elements 34 as later shown in FIG. 15. In this setting, an optical system magnification m is equal to 1, so that an N-points light and dark signal period P is equalized to a scale period Ps.

As shown in FIG. 6, in the signal processing circuit 60, inputted N-points light and dark signals are firstly noise-filtered by a noise filter amplifier circuit 62, are then amplified at a predetermined gain, and thereafter are analog-digitally converted by an A/D converter circuit 64. Subsequently, phases of the scale 13 are detected by a phase detection circuit 66, and then two-phase rectangular waves are outputted as position signals from a two-phase rectangular wave generator circuit 68 to a counter circuit or the like, for example.

A detailed description is further given of a function of the phase detection circuit 66 by using FIG. 8. The phase detection circuit 66 performs the fitting on the digitized N-points light and dark signals by the least-squares method using as a model of the aforementioned equation (1) which is a sinusoidal function with a fixed period. Thereby, the phase detection circuit 66 detects the phases of the N-points light and dark signals.

Here, a description is given of the least-squares method of the sinusoidal function. For simplicity, a horizontal axis represents a phase and a vertical axis represents intensity, as shown in FIG. 3.

Figure 3:
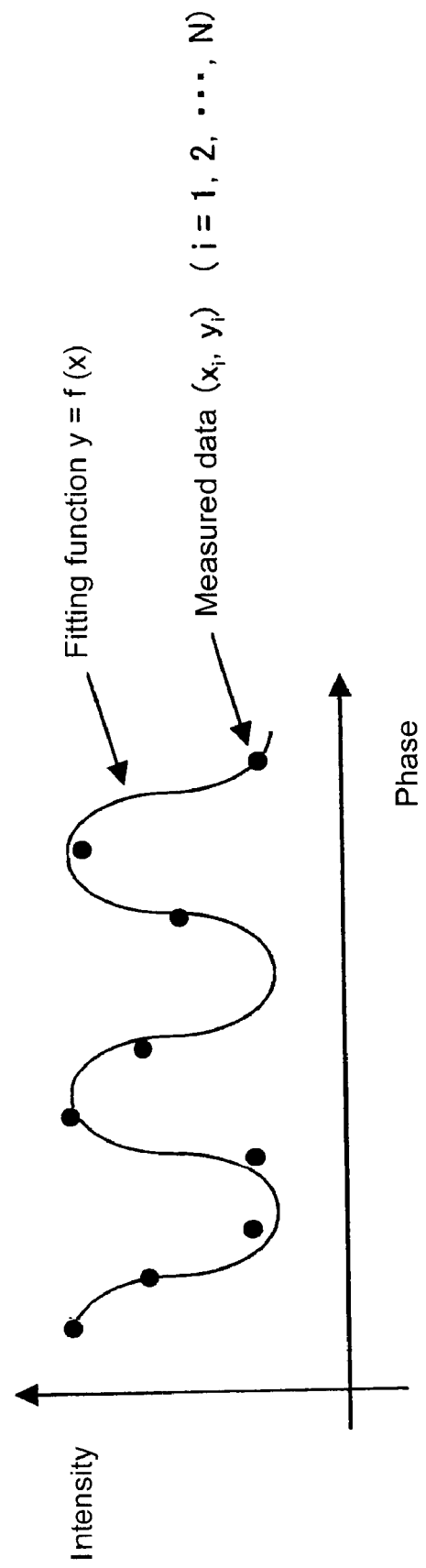
FIG. 3 is a graph showing an example of measurement data and a fitting function.

Firstly, as shown in FIG. 3, N data points $(x_i, y_i)$ are targeted for the fitting, and a fitting function is $f(x)$.

Parameter values in $f(x)$ to minimize the following expression may be obtained according to the definition of the least-squares method:

$$\Sigma_{i=1}^{N}\{y_i - f(x_i)\}^2 \qquad (13).$$

Here, parameters in $f(x)$ are assumed to be Ak (k=1, 2, ... and M). Since a result of partial differentiation of the expression (13) by Ak is zero, the following expression can be obtained:

$$\frac{\partial \sum_{i=1}^{N}\{y_i - f(x_i)\}^2}{\partial A_k} = 0. \qquad (14)$$

Since as many equations as the number of parameters M can be derived from the expression (14), Ak can be obtained by solving the equations as simultaneous equations.

As for general formulae of the least-squares method, refer to Daisuke Takahashi, *Fundamental Mathematics of Science and Engineering, Numerical Calculation* (Rikokei no kisos-ugaku, Suchi keisan), pp. 52-54.

Next, a description is given of a case where the fitting function is the sinusoidal function shown by the equation (1).

Since it is difficult to solve the simultaneous equations by substituting the equation (1) into the expression (14), the equation (1) is replaced with the following equation by using the formula for composition of trigonometric functions:

$$y = a \sin x + b \cos x + c \qquad (15).$$

When the equation (15) is substituted into the expression (14) to solve the simultaneous equations, a, b and c are obtained. In addition, the parameters A, B and C in the equation (1) can be obtained by the formula for composition of trigonometric functions as in the foregoing equations (2).

Since the initial phase B is equal to the phase of the scale 13, the scale position can be detected. Generally, when the least-squares method is applied by using a non-linear function as a model, a unique solution cannot be obtained. However, when the period of the sinusoidal function is fixed, a unique solution can exceptionally be obtained.

Figure 2:
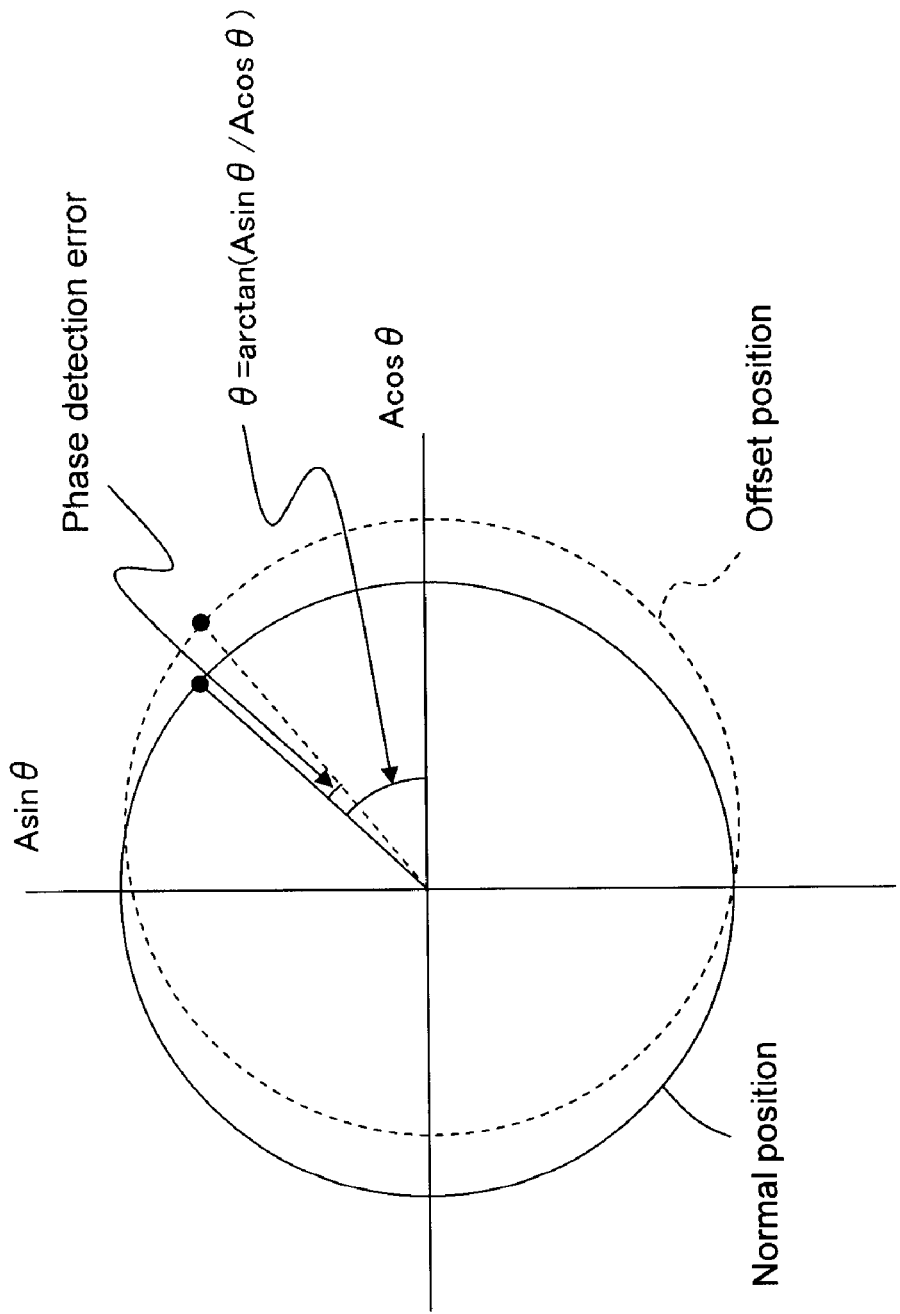
FIG. 2 is a graph showing a change of a Lissajous signal occurring in the case of FIG. 1.
Figure 10:
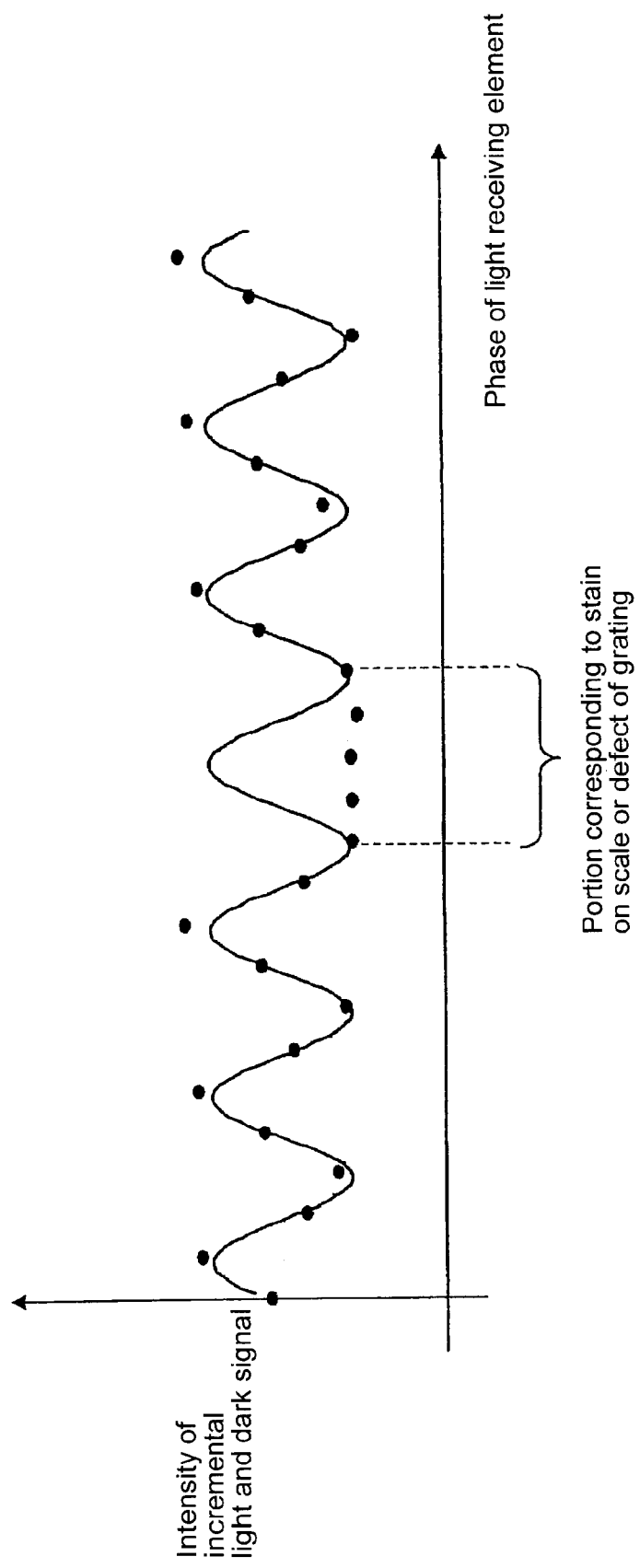
FIG. 10 is a diagram showing an example of a fitting state of the sinusoidal function in FIG. 9 in a case where the scale is adhered by stain or has a defect in the grating.

By using FIG. 10, a description is given of a case where the scale 13 is adhered by stain or has a defect in the grating 12. Although the intensity of the light and dark signals outputted by the light receiving elements 34 is lowered at a point corresponding to the stain on the scale or the defect of the grating, the light receiving elements in the same phase do not suffer from selective blocking of light beams. Further, the arctangent calculation is not performed in which an error occurs due to the direct current offset of the Lissajous signal as shown in FIG. 2. Thus, even when the signals are degraded due to the stain, an error is less likely to occur in the position detecting.

Figure 11:
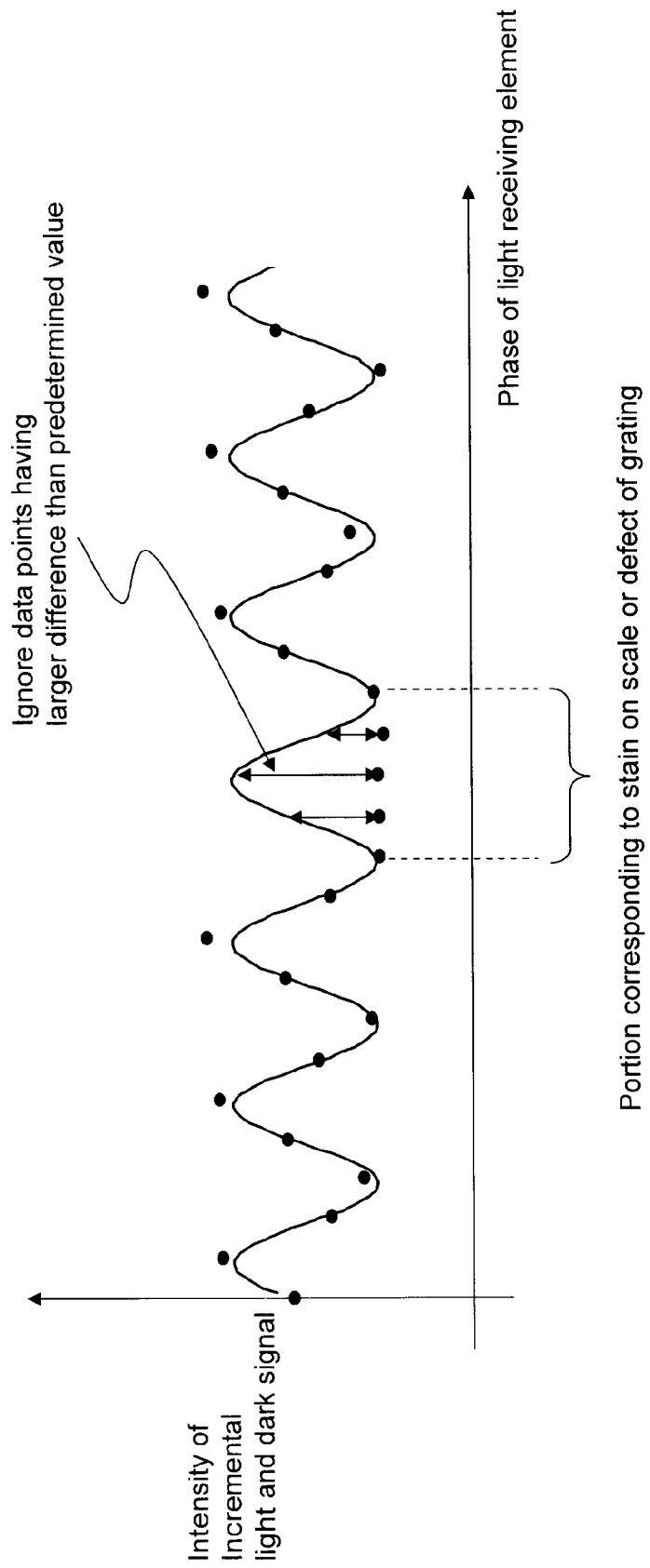
FIG. 11 is a diagram showing an example of ignoring data points having larger differences than a predetermined value in the first embodiment.

In addition, as shown in FIG. 11, data point having a larger difference than a predetermined value can be ignored in fitting processing, and thereby can be eliminated from position detecting target points.

Figure 12:
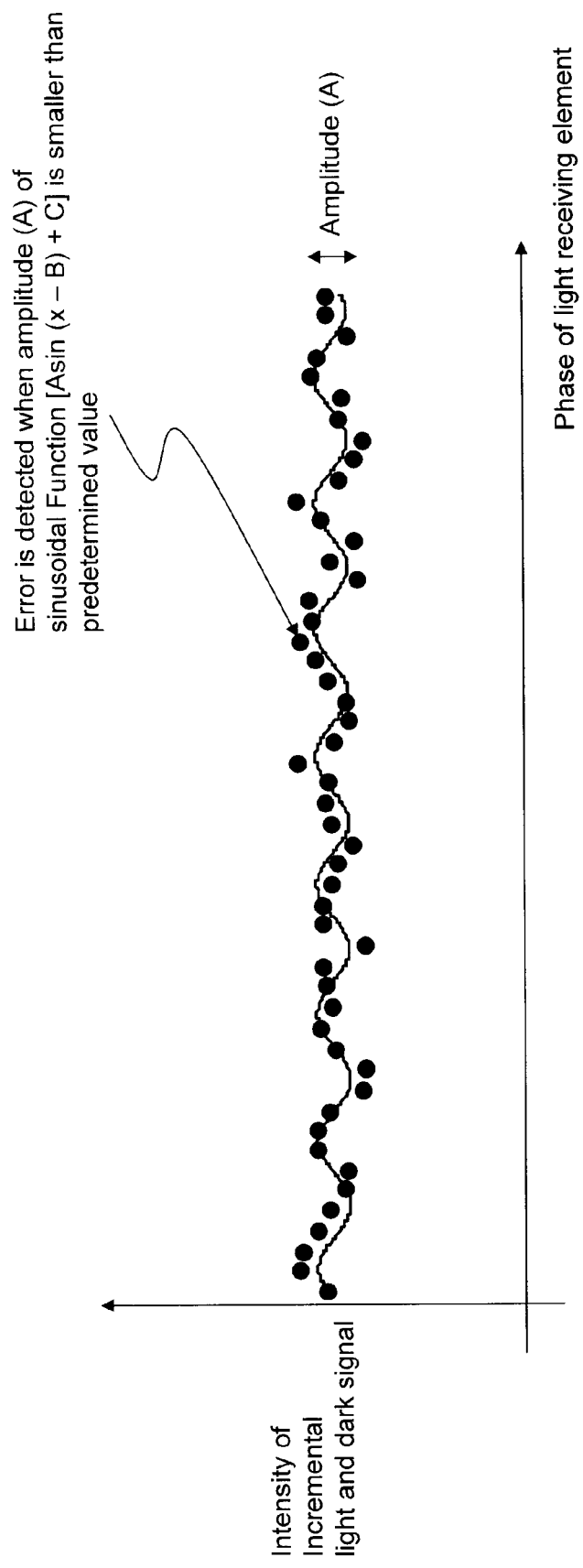
FIG. 12 is a diagram for explaining an accidental error in position detecting in the first embodiment.

When the scale 13 is adhered too much by stain or has too many defects in the grating 12, an amplitude A of the sinusoidal function takes a value near zero, as shown in FIG. 12. For this reason, an accidental error in position detecting can be detected by setting a predetermined threshold in advance. For example, a detection of a point corresponding to stain of the scale 13 or a defect of the grating 12 can be outputted as an error. Methods usable for outputting an error are, for example, a method in which the phase detection circuit 66 outputs an error signal as shown in FIG. 13A, and a method in which the two-phase rectangular wave generator circuit 68 outputs the rectangular waves with the phases matched with each other as shown in FIG. 13B.

Figure 14:
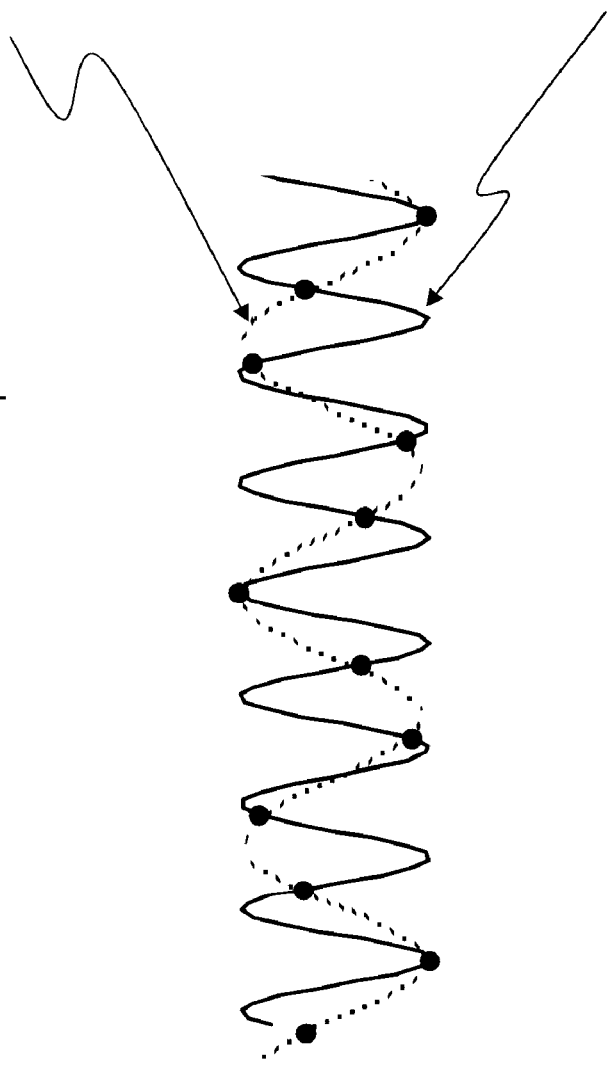
FIG. 14 is a diagram for explaining aliasing.

In addition, aliasing, which is an error of detecting a period different from the period (scale period) Ps of the incremental pattern of the scale 13 as indicated by a broken line in FIG. 14, can be avoided as indicated by the solid line by using the sinusoidal function with fixed period.

Figure 16:
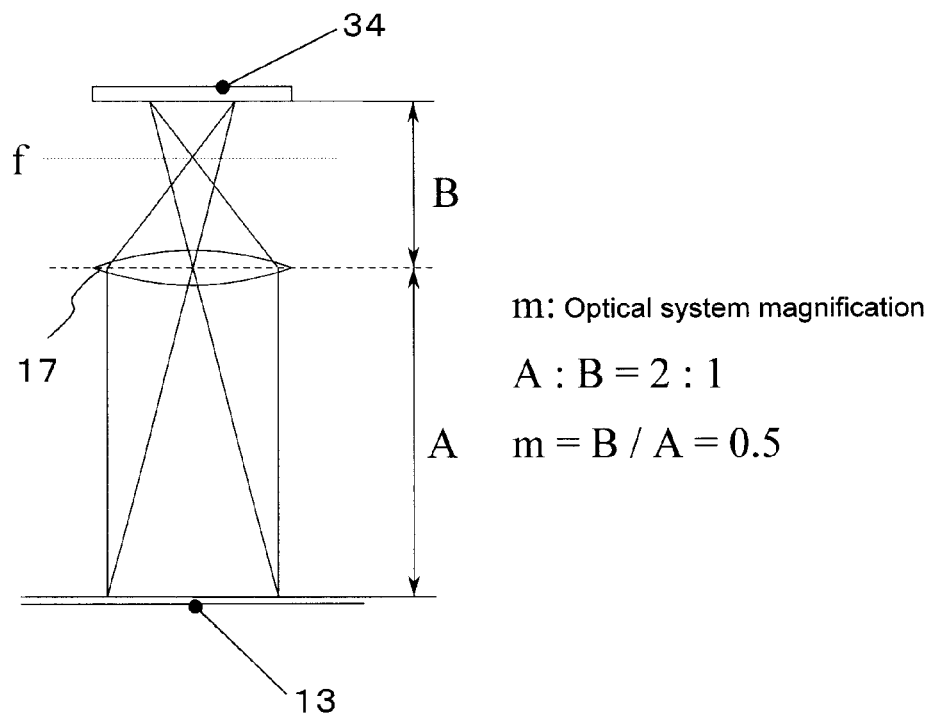
FIG. 16 is a diagram showing a configuration of a principal part in an example of the second embodiment.
Figure 17:
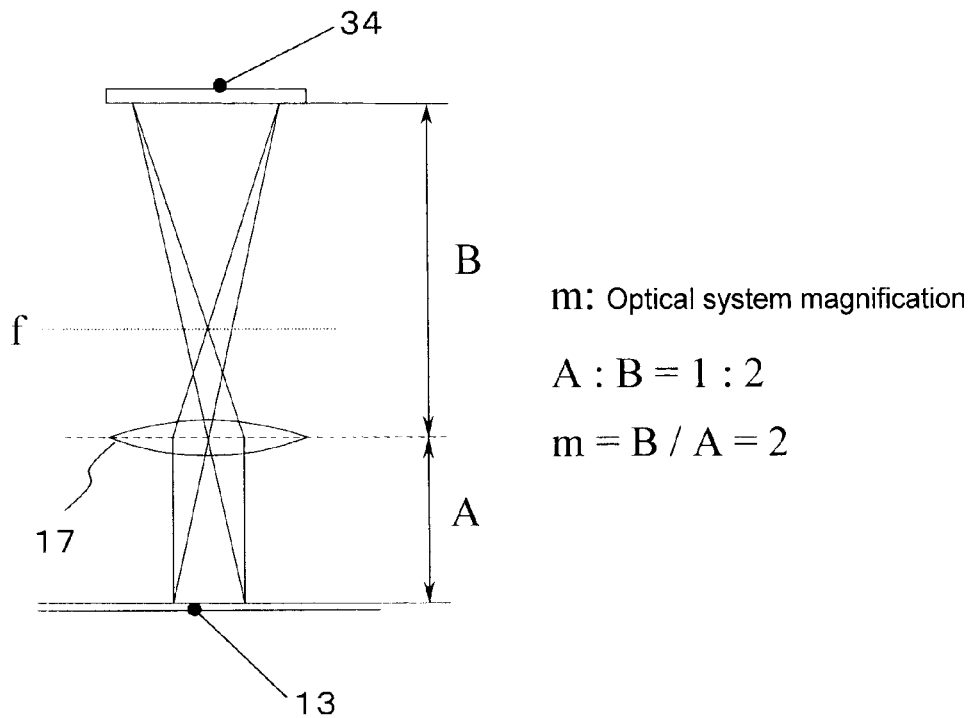
FIG. 17 is a diagram showing a configuration of a principal part in another example of the second embodiment.

In the above-described embodiment, the scale period Ps is equal to the N-points light and dark signal period P under the setting of the optical system magnification m=1. However, the optical system magnification m is not limited to 1, but may be any magnification, as in a second embodiment shown in FIG. 15, by setting different values as a distance A between a lens 17 and a scale 13 and a distance B between the lens 17 and light receiving elements 34. For example, the optical system magnification m may be set at 0.5 as shown in FIG. 16, or 2 as shown in FIG. 17. In FIGS. 15 to 17, reference letter f denotes a focal position of the lens 17.

Meanwhile, the data-point interval w corresponds to the light-receiving-element pitch Pd in the above-described embodiment. However, when the data-point interval w does not correspond to the light-receiving-element pitch Pd, the data point interval w can be replaced with a desired data point interval w' by performing interpolation on data points obtained at the light-receiving-element pitch Pd (=w).

Figure 18:
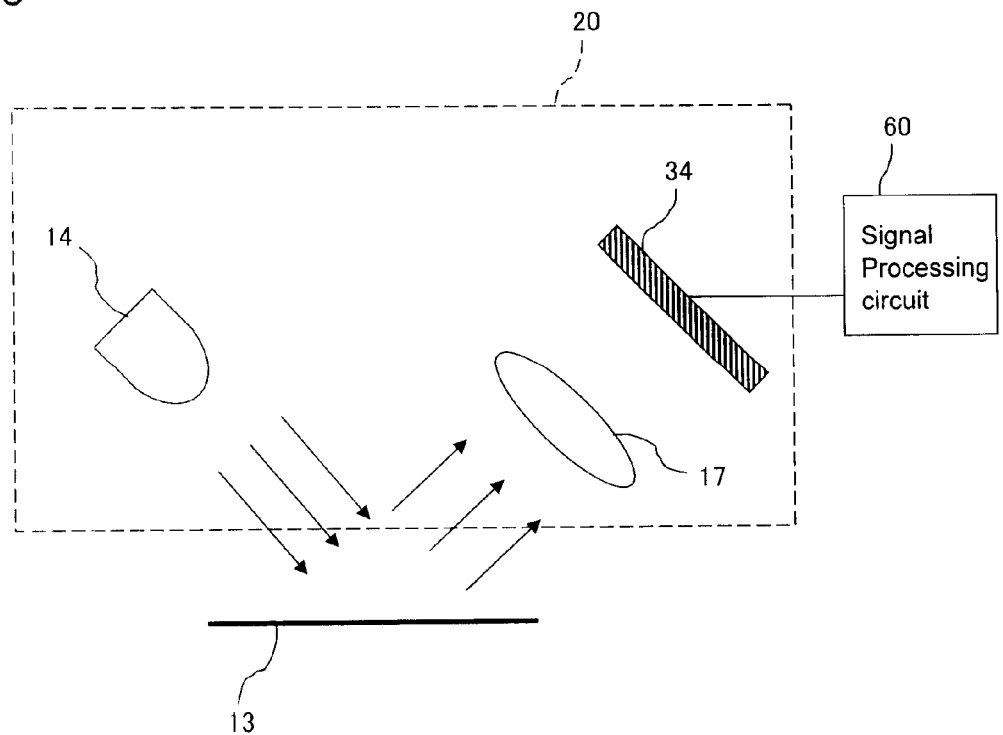
FIG. 18 is a diagram showing a configuration example of a reflection type photoelectric encoder to which the present invention as applicable.

Moreover, the present invention is also applicable to a reflection type photoelectric encoder as shown in FIG. 18.

The present invention is further applicable to even a rotary encoder as well as the linear encoder.

It should be apparent to those skilled in the art that the above-described exemplary embodiments are merely illustrative which represent the application of the principles of the present invention. Numerous and various other arrangements can be readily devised by those skilled in the art without departing from the spirit and the scope of the invention.

DESCRIPTION OF REFERENCE NUMERALS

12 . . . grating
13 . . . scale
14 . . . light emitting element (light source)
20 . . . detector head
30 . . . light receiving unit
34 . . . light receiving element
60 . . . signal processing circuit
66 . . . phase detection circuit
P . . . N-points light and dark signal period
w . . . data-point interval
L . . . overall analysis length
M . . . overall length of the light receiving element

What is claimed is:

1. A photoelectric encoder comprising:

a scale in which a grating is formed with a predetermined period Ps; and a detector head which is movable relative to the scale and which includes a light source and a light receiving unit, wherein in a configuration in which light receiving elements in the light receiving unit output N-points light and dark signals (N is an integer of 3 or more), and in which phases of the N-points light and dark signals are detected by performing a least-squares method to fit a sinusoidal function with fixed period to N-points digital signals respectively digitized from the N-points light and dark signals, a period P of the N-points light and dark signals is set at an integral multiple of a data-point interval w of the N-points digital signals, and an overall length M of the light receiving elements is set at an integral multiple of the period P of the N-points light and dark signals.

2. The photoelectric encoder according to claim 1, wherein the fitting function is a sinusoidal wave with fixed period expressed by $$y = A \sin(x-B) - C$$

where A, B and C are parameters.

3. The photoelectric encoder according to claim 2, wherein the parameters A, B and C are obtained by equations $$A = \frac{2}{N} \sqrt{\left(\sum_i y_i \sin x_i\right)^2 + \left(\sum_i y_i \cos x_i\right)^2}$$

$$\sin(-B) = \frac{\sum_i y_i \cos x_i}{\sqrt{\left(\sum_i y_i \sin x_i\right)^2 + \left(\sum_i y_i \cos x_i\right)^2}}$$

$$\cos(-B) = \frac{\sum_i y_i \sin x_i}{\sqrt{\left(\sum_i y_i \sin x_i\right)^2 + \left(\sum_i y_i \cos x_i\right)^2}}$$

$$C = \frac{\sum_i y_i}{N}.$$

4. The photoelectric encoder according to claim 2, wherein the parameter B is obtained by an equation $$B = \arctan\left(-\frac{\sum_i y_i \cos x_i}{\sum_i y_i \sin x_i}\right).$$

5. The photoelectric encoder according to claim 1, wherein when the period P of the N-points light and dark signals is not an integral multiple of the data-point interval w of the N-points digital signals, data points are generated by performing interpolation on the data-point interval w of the N-points digital signals so that the period P of the N-points light and dark signals is an integral multiple of the data-point interval w of the N-points digital signals.

6. The photoelectric encoder according to claim 1, wherein when the overall length M of the light receiving elements is not an integral multiple of the period P of the N-points light and dark signals, an overall analysis length L is adjusted by truncating the overall length M of the light receiving elements so that the overall analysis length L is an integral multiple of the period P of the N-points light and dark signals.

7. The photoelectric encoder according to claim 1, wherein the period P of the N-points light and dark signals is equalize to the scale period Ps.

8. The photoelectric encoder according to claim 1, wherein the data-point interval w of the N-points digital signals is made to correspond to a pitch Pd of the light receiving elements.

9. The photoelectric encoder according to claim 1, wherein stain on the scale or a defect of the grating is detected based on the N-points light and dark signals.

10. The photoelectric encoder according to claim 9, wherein a point corresponding to the stain on the scale or the defect of the grating is excluded from fitting target points, and thereafter the fitting is performed again.

11. The photoelectric encoder according to claim 2, wherein an accidental error in position sensing is detected when an amplitude A of the sinusoidal function is smaller than a predetermined threshold.

* * * * *